United States Patent
Coman et al.

(10) Patent No.: US 12,032,917 B2
(45) Date of Patent: Jul. 9, 2024

(54) SINCERITY-AWARE ARTIFICIAL INTELLIGENCE-BASED CONVERSATIONAL AGENTS

(71) Applicant: Capital One Services, LLC, McLean, VA (US)

(72) Inventors: Alexandra Coman, Tysons Corner, VA (US); Erik T. Mueller, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 277 days.

(21) Appl. No.: 17/486,830

(22) Filed: Sep. 27, 2021

(65) Prior Publication Data

US 2023/0099604 A1 Mar. 30, 2023

(51) Int. Cl.
| | |
|---|---|
| G06F 40/35 | (2020.01) |
| G06F 21/62 | (2013.01) |
| G06F 40/40 | (2020.01) |
| G06N 5/043 | (2023.01) |
| G06N 5/045 | (2023.01) |

(52) U.S. Cl.
CPC .............. *G06F 40/40* (2020.01); *G06F 21/62* (2013.01); *G06N 5/043* (2013.01); *G06N 5/045* (2013.01)

(58) Field of Classification Search
CPC .......... G06F 40/30; G06F 40/40; G06F 40/56
See application file for complete search history.

(56) References Cited

U.S. PATENT DOCUMENTS

| | | | |
|---|---|---|---|
| 9,098,818 B2 | 8/2015 | Marks et al. | |
| 11,263,241 B2* | 3/2022 | Rezaeian | G06F 16/285 |
| 11,442,992 B1* | 9/2022 | Moon | G06N 20/00 |
| 11,455,981 B2* | 9/2022 | Amid | G10L 15/063 |

(Continued)

FOREIGN PATENT DOCUMENTS

CA 2588847 C 11/2013

OTHER PUBLICATIONS

Budhitama Subagdja and Ah-Hwee Tan. 2019. Beyond Autonomy: The Self and Life of Social Agents. In Proc. of the 18th International Conference on Autonomous Agents and Multiagent Systems (AAMAS 2019), Montreal, Canada, May 13-17, 2019, IFAAMAS, 5 pages.

(Continued)

*Primary Examiner* — Daniel Abebe
(74) *Attorney, Agent, or Firm* — Banner & Witcoff, Ltd.

(57) ABSTRACT

A computing device may execute a conversational agent that may receive language input. The conversational agent may analyze the language input based on configured goals to determine conclusions regarding the language input. The conversational agent may determine whether to modify the truth of one or more of the conclusions, and whether to include or omit the one or more conclusions or modified conclusions in an output response. The conversational agent may also store justifications for including or omitting each conclusion or modified conclusion. The conversational agent may output a response that indicates the conclusions and/or modified conclusions that were selected for output. A user may request that the conversational agent output the justifications for generating the output response. The conversational agent may output the justifications based on receiving the request.

20 Claims, 5 Drawing Sheets

(56) References Cited

U.S. PATENT DOCUMENTS

| | | | |
|---|---|---|---|
| 11,714,855 B2* | 8/2023 | Mahindru | G06F 18/2185 |
| | | | 704/9 |
| 11,741,306 B2* | 8/2023 | Galley | G06N 3/044 |
| | | | 704/9 |
| 2008/0261181 A1 | 10/2008 | Kennedy et al. | |
| 2013/0036459 A1 | 2/2013 | Liberman et al. | |
| 2013/0138461 A1 | 5/2013 | Shahraray et al. | |
| 2015/0254566 A1 | 9/2015 | Chandramouli et al. | |
| 2015/0287339 A1 | 10/2015 | Deshmukh et al. | |
| 2016/0093226 A1 | 3/2016 | Machluf et al. | |
| 2017/0243463 A1 | 8/2017 | Rdzak | |
| 2018/0367483 A1 | 12/2018 | Rodriguez et al. | |
| 2019/0052584 A1 | 2/2019 | Barve et al. | |
| 2019/0057143 A1 | 2/2019 | Porter | |
| 2019/0103099 A1* | 4/2019 | Panainte | G10L 15/063 |
| 2019/0273701 A1 | 9/2019 | Basheer et al. | |
| 2020/0125586 A1* | 4/2020 | Rezaeian | G06F 3/048 |
| 2020/0134418 A1 | 4/2020 | Harrington et al. | |
| 2020/0160471 A1 | 5/2020 | Bohannon et al. | |
| 2020/0364646 A1 | 11/2020 | Arar et al. | |
| 2021/0174288 A1 | 6/2021 | Gvildys et al. | |
| 2021/0201916 A1 | 7/2021 | Touret et al. | |
| 2021/0212619 A1 | 7/2021 | Crockett et al. | |
| 2021/0258345 A1 | 8/2021 | Wardman et al. | |
| 2021/0365345 A1 | 11/2021 | Roy et al. | |
| 2022/0188304 A1* | 6/2022 | Samal | G10L 15/22 |
| 2022/0199079 A1 | 6/2022 | Hanson et al. | |
| 2022/0394457 A1 | 12/2022 | Mene et al. | |
| 2023/0140791 A1 | 5/2023 | Brambila et al. | |
| 2023/0196015 A1* | 6/2023 | Coman | G06F 40/295 |
| | | | 704/9 |

OTHER PUBLICATIONS

Langley, P., Laird, J., and Rogers, S. 2009. Cognitive Architectures: Research Issues and Challenges. Cognitive Systems Research. 10. 141-160.

BiLAT Overview—USC Institute for Creative Technologies—ARL, Jun. 2012.

Kim, Julia M., et al. "BiLAT: A game-based environment for practicing negotiation in a cultural context." International Journal of Artificial Intelligence in Education 19.3 (2009): 289-308.

Marsella, Stacy C., and Jonathan Gratch. "Ema: A process model of appraisal dynamics." Cognitive Systems Research 10.1 (2009): 70-90.

Riedl MO. Computational narrative intelligence: A human-centered goal for artificial intelligence. arXiv preprint arXiv:1602.06484. Feb. 21, 2016.

Shim, Jaeeun, and Ronald C. Arkin. "A taxonomy of robot deception and its benefits in HRI." 2013 IEEE international conference on systems, man, and cybernetics. IEEE, 2013.

Vattam S, Klenk M, Molineaux M, Aha DW. Breadth of Approaches to Goal Reasoning: A Research Survey. InGoal Reasoning: Papers from the ACS Workshop Dec. 14, 2013 (p. 111).

Dec. 2, 20232—(US) Office Action—U.S. Appl. No. 17/553,349.

\* cited by examiner

SINCERITY-AWARE ARTIFICIAL INTELLIGENCE-BASED CONVERSATIONAL AGENTS

TECHNICAL FIELD

The present disclosure is generally related to improving the functionality of artificial intelligence (AI)-based conversational agents.

BACKGROUND

A computer-based system may be configured to execute a conversational agent (CA), such as a chatbot, which may engage in a conversation with one or more users. Increasingly, AI techniques are being employed to enhance the functionality of these CAs. For example, a CA may be configured to utilize machine learning (ML) techniques that may allow the CA to learn from previous user input, to comprehend user language input by using natural language understanding (NLU), and/or to use natural language generation (NLG) to generate language output similar to content that might be generated by a human being.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding methods, apparatuses, systems, and computer-readable media are also within the scope of the disclosure.

Systems described herein provide a computing system that may be configured to execute an application. The application may comprise a CA, which may be configured to engage in a conversation with one or more users. As part of a conversation, a CA may receive language input from a user. Such language input may take the form of text, speech, etc. The CA may be further configured to use various techniques to analyze such language input. For example, the CA may be configured to use NLU to transform the natural language input into a format that is understandable by a computing device, such as the CA.

Based on analyzing the language input, the CA may generate and output a response to a user. Increasingly, such CAs are capable of producing response output that attempts to mimic the language of human beings. For example, a CA may be configured to analyze language input and generate natural language output based on the analysis. As an example, the language input may take the form of a manuscript that a user has written. Based on analyzing the user's manuscript, the CA may determine various conclusions that may be associated with the manuscript. Such example conclusions may include whether characters in the manuscript are well-developed, whether the author has used proper grammar, etc. The CA may generate a response output that indicates one or more of these determined conclusions.

Such CAs may also be capable of generating output responses that include insincere conclusions. An insincere output response may include misrepresentations or omissions of one or more of the conclusions determined by the CA. In the example of analyzing the received manuscript, the CA may reach the conclusion that the manuscript has poor character development. However, outputting a sincere version of this conclusion, such as an output that indicates that the characters are poorly developed, may offend the writer, which may be undesirable. Accordingly, a CA may be configured to generate insincere output that misrepresents the conclusion that the characters are poorly developed. Generating this insincere output may involve omitting the conclusion that the characters are poorly developed, or may involve including a conclusion that misrepresents the conclusion entirely, for instance by indicating that the characters are properly developed, etc.

However, there may be ethical issues related to a CA that is capable of generating insincere output. For example, in the case of a CA configured to generate output regarding a user's health, it may be impermissible to output insincere conclusions regarding the user's medical condition. Accordingly, it is imperative that an insincerity-capable CA be capable of revealing whether an outputted conclusion was sincere or insincere, and/or the factors that caused the CA used to output the insincere conclusion. Accordingly, the techniques of this disclosure describe an insincerity-capable CA which may be audited by users to determine: (1) whether a conclusion outputted by the CA was sincere or insincere or omitted, and/or (2) the factors that caused the CA to output an insincere conclusion or to omit a conclusion from a response. Enabling the CA to be audited in order to determine which outputted conclusions are insincere, and the factors that led to generating the insincere output may alleviate such ethical concerns related to an insincerity-capable CA that is capable of generating insincere output.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
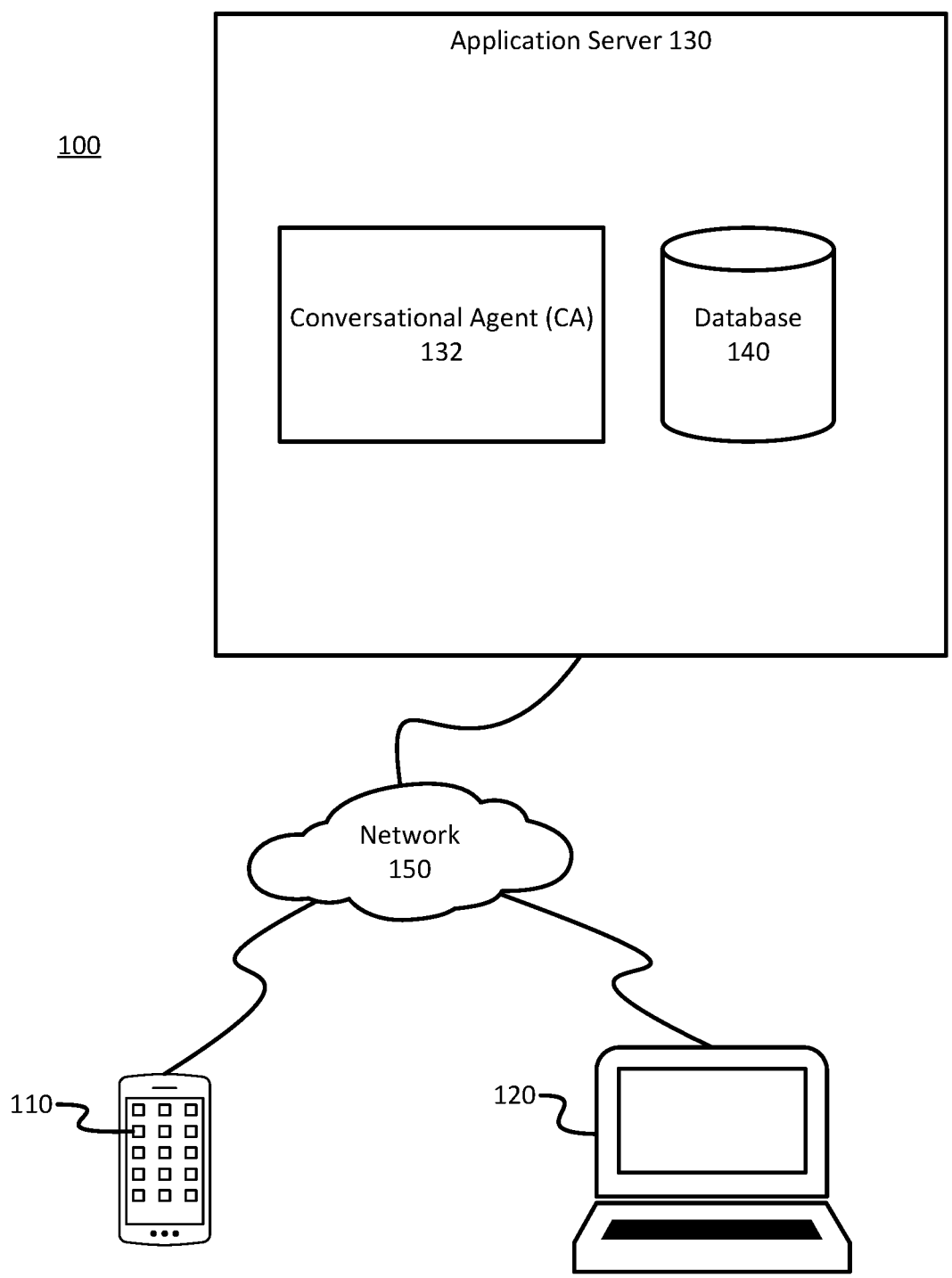
FIG. 1 shows an example of an operating environment in which one or more aspects described herein may be implemented.

In the following description of the various embodiments, reference is made to the accompanying drawings, which form a part hereof, and in which are shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and for computer-based systems that are configured to execute one or more applications, such as an application that may invoke a CA. A CA configured in accordance with the techniques of this disclosure may be configured to receive user input. The user input may comprise language, such as text or speech. Based on the user input, the CA may generate response output that is also in the form of language. After receiving user input, the CA may be configured to use various techniques, such as NLU, to transform the input data to an annotated format that is understandable by the computing device that is executing the CA. The CA may also be configured with a set of one or more goals that may govern the process of analyzing the language input and/or generating an output response. Based on the annotated format of the language input and the goals of the CA, the CA may determine one or more conclusions about the language input. The CA may generate an output response based on the determined conclusions, and the response may indicate one or more of the determined conclusions.

The techniques of this disclosure relate to an insincerity-capable CA that may be configured to reveal justifications for generating an insincere output response. Such an insincerity-capable CA may be capable of generating an output response that indicates conclusions that the CA determined. In some examples, however, some or all of the conclusions indicated in the output response may be insincere. For instance, an output response may indicate the opposite of a determined conclusion. Additionally or alternatively, the CA may omit one or more determined conclusions from the response, which is also a form of insincerity.

For each conclusion that the CA includes in, or omits from a response, the CA may store a corresponding justification for including or omitting that conclusion. The justification for including a conclusion may comprise the goals and/or other determinations that caused the CA to include the conclusion in the response, as some examples. A user of the CA may request the justifications for the response output. In response to receiving the request, the CA may send the requested justification to the user for review. Providing the user with the justifications for the conclusions included in the output response may give the user greater insight into the decision-making process of the CA by allowing the user to: review each conclusion that the CA determined before generating a corresponding output response, determine whether a given outputted response includes one or more insincere conclusions, determine the factors that caused the CA to include a insincere or sincere conclusion, and determine the reasoning for omitting a conclusion from an output response. Thus, because the techniques of this disclosure configure a CA to store justifications for response outputs to reveal those justifications, the techniques of this disclosure may resolve ethical issues involving an insincerity-capable CA that may generate insincere output responses.

Based on determining the set of beliefs to include in the response, the CA may output a response to the language input. The CA may generate the output response using various techniques, such as NLG, which may make the output response language attempt to mimic language generated by a human. Using NLG to generate the output response may involve utilizing techniques such as AI, machine learning, deep learning, neural networks, etc.

Operating Environments and Computing Devices

FIG. 1 shows an operating environment 100. The operating environment 100 may include at least user client device 110, client device 120, and application server 130 in communication via a network 150. It will be appreciated that the network connections shown in relation to network 150 are illustrative and any means of establishing a communications link between the computers may be used. The existence of any of various network protocols such as TCP/IP, Ethernet, FTP, HTTP and the like, and of various wireless communication technologies such as Bluetooth, GSM, CDMA, 3GPP protocols, WiFi, LTE, and/or 5G, is presumed, and the various computing devices described herein may be configured to communicate using any of these network protocols or technologies. Any of the devices and systems described herein may be implemented, in whole or in part, using one or more computing systems described with respect to FIG. 2.

Client devices 110, 120 may execute, provide data to, and/or interact with the applications described herein, such as CA 132. Examples of client devices 110, 120 may comprise computing devices, such as smartphones, tablets, laptops, wearable devices, or various other forms of computing devices as well. Access to application server 130 or resources thereof may be restricted to certain ones of client devices 110, 120 such as client devices that provide certain credentials for authenticating users of those client devices.

Application server 130 may comprise one or more devices, which may include processors and/or memory, that may be configured to execute a variety of different applications and/or components that may employ the techniques of this disclosure. Application server 130 may comprise components and/or associated applications such as Conversational Agent (CA) 132, and/or database 140.

CA 132 may execute on application server 130. CA 132 may comprise a web application, mobile application, or any other type of application. While CA 132 is illustrated as executing on application server 130, it should be understood that CA 132 may partially execute on application server 130, and/or on client devices 110, 120. For example, CA 132 may comprise a web application that may be rendered by a web browser executing on client devices 110, 120. In this manner, CA 132 may deliver a web-based payload to client devices 110, 120.

If CA 132 partially executes on a client device, CA 132 application may receive data from a component of CA 132 executing on application server 130, such as a back-end component. As another example, CA 132 may be a stand-alone application that does not communicate with application server 130. CA 132 may be distributed, and/or execute on other devices as well. According to various examples, CA 132 may comprise a desktop application, mobile application, web application, or a combination thereof. In some examples, CA 132 may be configured as a browser extension that may execute in conjunction with a web browser. Such a web browser may in turn execute on client devices 110 or 120. CA 132 may take various other forms as well.

Application server 130 may execute database 140, which may be an in-memory database that may offer faster database reads and writes as compared to databases that are not in-memory. Examples of such databases may include, but are not limited to: relational databases, hierarchical databases, distributed databases, in-memory databases, flat file databases, XML databases, NoSQL databases, graph databases, and/or a combination thereof.

Database 140 may store data associated with CA 132. Such stored data may comprise information that may be used to authenticate users, such as usernames and passwords, user profile information, and/or application data. Such application data may alternatively or additionally comprise previously-inputted user language inputs, goals, conclusions corresponding to an input, output responses, etc.

CA 132 may be configured to receive language as input and based on the language input, may generate output, which may include insincere output in some examples. Such insincere output may include omissions of conclusions, and/or or may include conclusions that are the opposite of conclusions actually reached by CA 132. CA 132 may receive natural language input from a user of a computing device, such as one or more of client devices 110, 120. As an example, the CA may be configured to receive text-based natural language input in the form of a writer's manuscript.

CA 132 may be configured to analyze natural language input using various techniques, such as NLU. Such NLU techniques may utilize a lexicon of the input language, as well as a parser and/or grammar rules to transform the input language into a format that is understandable by the computing device. As an example, CA 132 may use NLU to transform received natural language input to an annotated format that is understandable by application server 130. For instance, CA 132 may apply various annotations to the writer's manuscript to transform the manuscript to an annotated format that application server 130 may be capable of analyzing.

CA 132 may also be configured with a set of one or more goals that may form a basis for analyzing received language input. These goals may be predetermined or they may be determined by using various techniques, such as by machine learning, deep learning, rule-based learning, retrieval, inference, evaluation, etc. Various AI techniques, such as AI planning, may be used to pursue these goals. In the example in which CA 132 is configured to analyze the manuscript, example goals may include: (1) encouraging the writer to continue writing, and (2) providing feedback to the writer to help the writer improve his or her writing. In some examples, these goals may each have a corresponding associated priority. For instance, the first goal, encouraging the writer to continue writing, may have a higher priority than providing the writer feedback. In some cases, CA 132 may be configured to modify its goals, for instance by using various machine learning techniques to learn new goals, add, or remove goals.

Based on the set of configured goals and the language input, and analysis techniques, CA 132 may generate one or more conclusions about the language input. In some examples, the conclusions may be based on data from a data source, such as a local file, database, application programming interface (API), data obtained from the internet, etc., in addition to the input language itself. In the manuscript example, based on the goals of encouraging the writer to write and providing feedback to the writer, and also based on analyzing the manuscript, CA 132 may reach the conclusions that the manuscript has poor character development, but also uses proper grammar, and has high-quality dialog, as just some examples. As other examples, CA 132 may reach various conclusions about the author, such as about the author's mental state. For instance, CA 132 may conclude that the author is currently feeling discouraged from continuing to write and therefore should not receive negative feedback regarding the manuscript, etc.

CA 132 may represent these determined conclusions in various manners. For instance, each conclusion that CA 132 determines may be represented by a corresponding value. In some examples, the set of all conclusion values may be represented as a tuple. Each of these conclusion values may also take various forms. As an example, each conclusion value may be represented by either a true or false value. In some cases, a value for a given conclusion may indicate that a given belief is unknown. Cases in which CA 132 is configured to represent conclusions by true, false, or unknown values are referred to as the "open-world assumption." Cases in which conclusion values are only represented by true or false values are referred to as the "closed-world assumption." The output response that CA 132 generates may be considered to be sincere or insincere depending upon whether CA 132 uses the open or closed world consumption. For example, if CA 132 determines that the value of a conclusion is unknown (e.g., because CA 132 cannot determine the conclusion with sufficient certainty), and omits that conclusion from an output response, the omission of the conclusion would not be considered to be insincere. Whereas, if CA 132 employs the closed-world assumption, determines the value of a conclusion as only true or false (i.e., the conclusion cannot be unknown), and omits the conclusion, the omission would be considered to be insincere.

Also based on the current goals of CA 132, CA 132 may determine a set of conclusions that should be included in a response to be outputted. Some or all of the previously-reached conclusions may be included in the response. In the previous example of analyzing the manuscript, CA 132 may determine to include the conclusions that the writer uses proper grammar, has high-quality dialog, and also the conclusion that the manuscript has poor character development in a response. For instance, CA 132 may determine to include the beliefs that the writer has poor character development, writes high-quality dialog, and uses proper grammar, as some examples.

According to some examples, CA 132 may determine whether to include a given conclusion in an output response based on a utility of including versus omitting the conclusion in the response. CA 132 may also determine the utility of including a modified conclusion, that is, a conclusion having its truth changed (e.g., changing a true value to a false value, etc.) in the response. The utility of modifying or omitting a given conclusion may be determined based on a utility function that takes a conclusion and one or more goals as input, and based on the input, outputs a value representing the value of including or omitting the conclusion, and/or the value of modifying a given conclusion. The output of the utility function may take the form of a probability value according to some examples. For instance, the utility function may output a probability value indicating that the probability of the conclusion that the manuscript uses proper grammar is very high, such as 0.9 out of a maximum probability value of 1.0. The probability value associated with omitting this belief may be very low, such as 0.05 or 0.1 out of a maximum of 1.0, as some examples. If CA 132 changes a conclusion (e.g., from a true to a false conclusion), including the changed conclusion in the response output may have a greater utility than including the original, unchanged conclusion in the response output.

For each determined conclusion, CA 132 may determine and store a corresponding justification. The justification for a given conclusion may indicate factors that caused CA 132 to include or omit the corresponding conclusion in a response output, and/or factors that caused CA 132 to maintain or change the truth value of a determined conclusion that was included in a response. Such factors included in a justification may comprise the goals of CA 132, a value of the utility of including or omitting the corresponding conclusion, etc. As an example, if CA 132 determines to include in a response the conclusion that the writer's manuscript uses proper grammar, the corresponding justification may indicate that the conclusion was included in the response based on the goal of getting the writer to continue writing the manuscript, and the utility of including the conclusion in the response being higher than the utility of omitting the conclusion.

Based on the conclusions determined for a given input and the justifications for including each conclusion, CA 132 may generate and output a response that includes the conclusions that were selected for inclusion in the response. CA 132 may use various techniques, such as NLG to generate the output response that includes the selected inclusions. CA 132 may use techniques such as neural networks, machine learning, deep learning, rule-based learning, etc. to generate the output response.

CA 132 may also be configured to operate in a "sincerity mode." While operating in sincerity mode, a user may query CA 132 for the underlying data that is associated with a previously-output response, or the underlying data for a current response. When executing in the sincerity mode, CA 132 may receive an input, and in response to that input, may output the underlying data that caused CA 132 to generate the response corresponding to the input. The underlying data for a given input may comprise: the annotated input, all conclusions that were determined by CA 132 when generating the response, the conclusions actually included in the output response, and the corresponding justification for each conclusion that was reached.

Various computing devices are described as performing functions described in the context of operating environment 100. However, it should be noted that any computing device or combination of computing devices in the operating environment 100 may perform any of the processes and/or store any data as described herein.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in data transfers to protect the integrity of the data such as, but not limited to, Secure File Transfer Protocol (SFTP), and/or Pretty Good Privacy (PGP) encryption. In many embodiments, one or more web services may be implemented within the various computing devices of operating environment 100. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
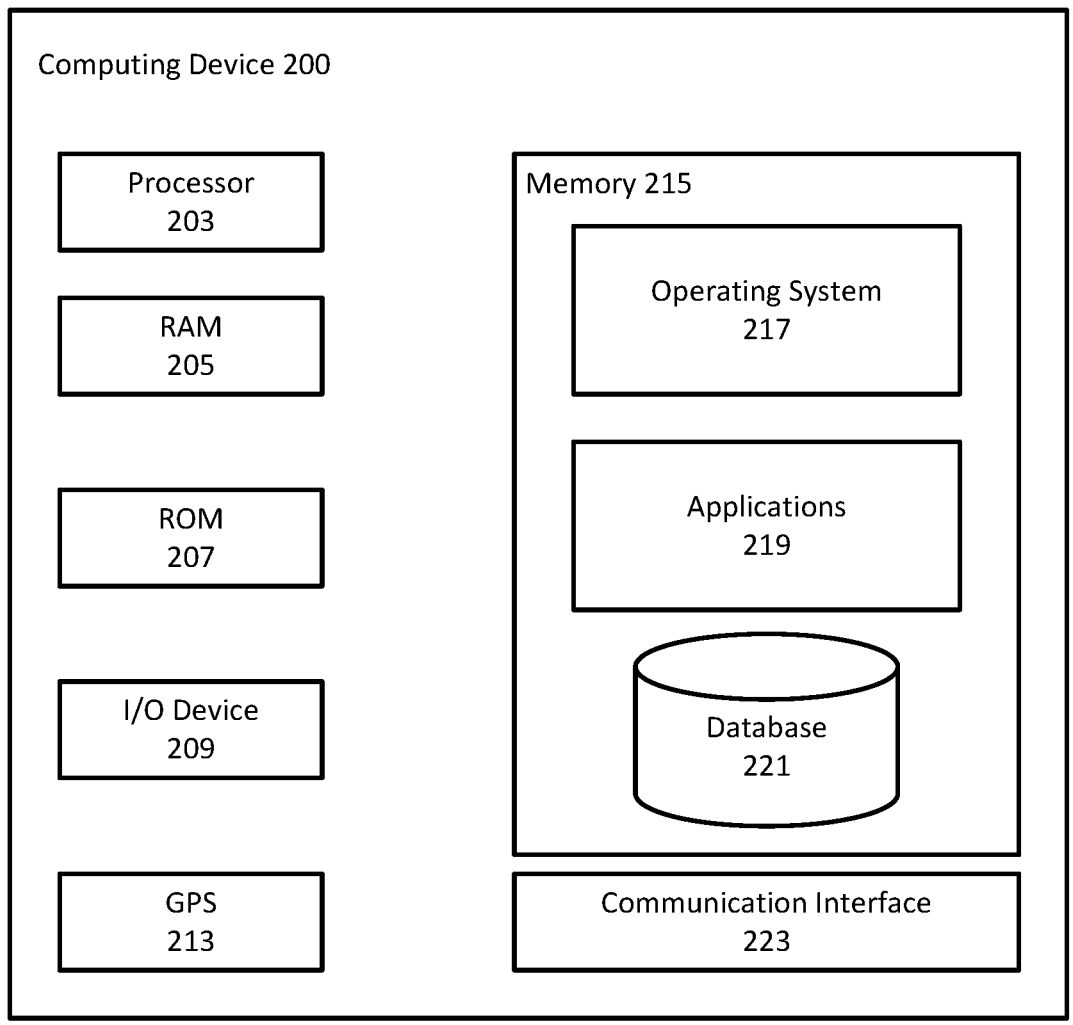
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 223, and/or memory 215. A data bus may interconnect processor(s) 203, RAM 205, ROM 207, memory 215, I/O device 209, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, wearable device, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, applications 219, and/or an associated internal database 221. The various hardware memory units in memory 215 may include volatile and/or nonvolatile, removable and/or non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 223 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP/S, TLS, and the like, and of various wireless communication technologies such as GSM, CDMA, WiFi, LTE, and/or 5G is presumed, and the various computing devices described herein may be configured to communicate using any of these network protocols or technologies.

Processor 203 may include a single central processing unit (CPU), which may be a single-core or multi-core processor, or may include multiple CPUs, which may have a single core or multiple cores. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Conversational Agent Flows

As discussed herein, CA 132 may be configured to receive input language, and based on the input language, determine one or more conclusions about the input language. CA 132 may determine to include or omit any of these conclusions in an output response. CA 132 may also change the truth value of any of the conclusions that were determined to be included in the response.

Figure 3:
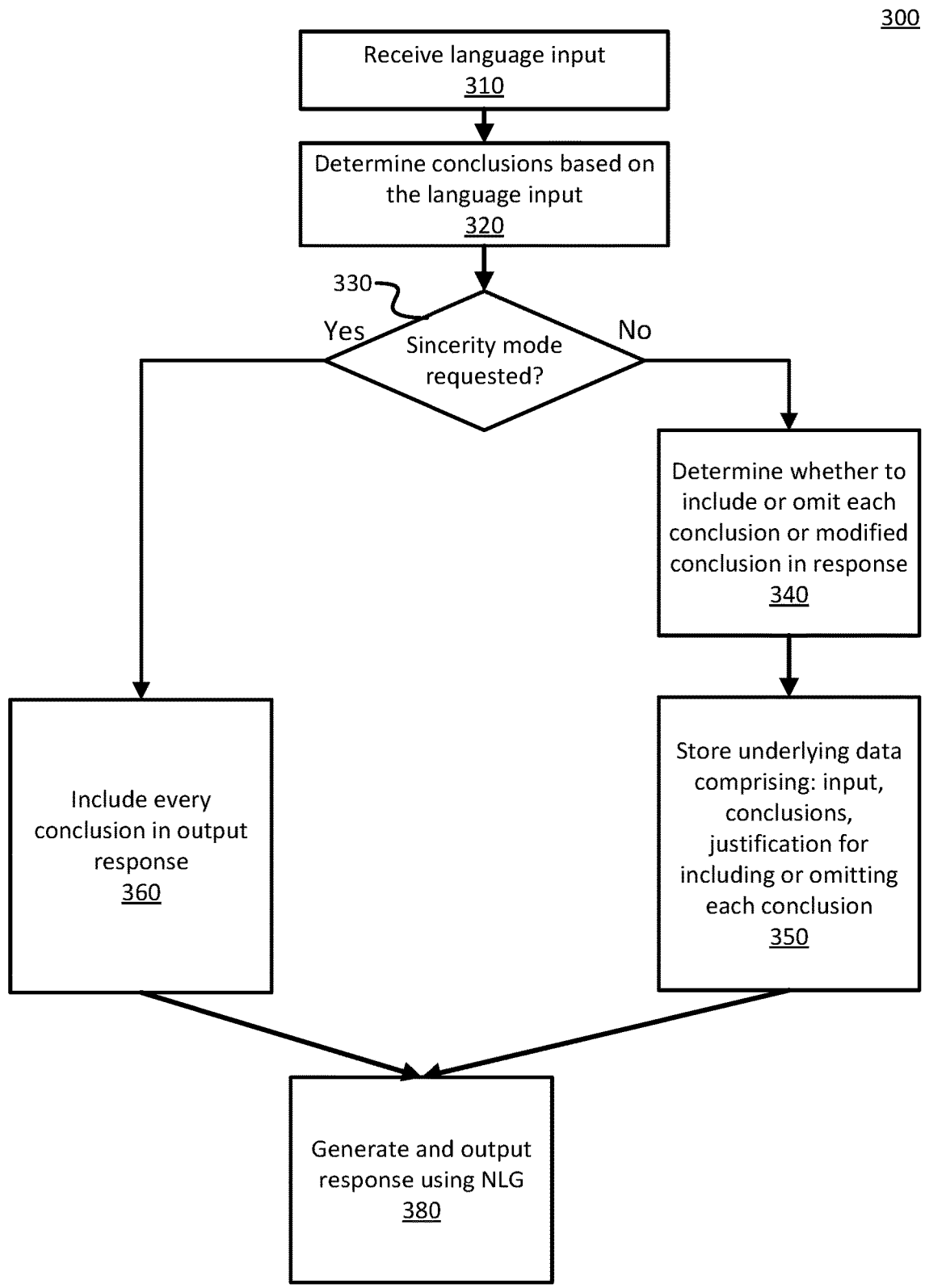
FIG. 3 shows an example of a flow chart of a process for outputting a response based on language input.

FIG. 3 shows an example flow chart of such a process 300 for outputting a response based on language input. Some or all of the steps of process 300 may be performed using one or more computing devices as described herein. In a variety of embodiments, some or all of the steps described below may be combined and/or divided into sub-steps as appropriate.

At step 310, a computing device (e.g., CA 132 executing on application server 130) may receive language input, such as text or speech. The language input may be received from a client device such as one of client devices 110, 120.

At step 320, the computing device may determine one or more conclusions based on the language input. The conclusions may be determined based on one or more goals with which the computing device is configured. The conclusions may be determined by using various techniques, such as inference, retrieval of data from a data source, evaluation, machine learning, etc.

At the decision block of step 330, the computing device may determine whether a user has requested that the computing device enable sincerity mode. If enabled, sincerity mode may cause the computing device to output the underlying data, such as justifications, language input, conclusions, etc., that caused the computing device to output a given response output. Based on receiving the request to enable sincerity mode, the computing device may determine whether the requesting user has sufficient permissions to enable sincerity mode. If the user lacks sincerity mode permissions, the computing device may report the user for lacking appropriate sincerity mode permissions.

If sincerity mode has not been requested ("NO" branch of step 330), the computing device may determine whether to include or omit each conclusion, or modified version thereof, in a response to the input. Each conclusion may be a conclusion for which the computing device has determined a corresponding value. Each modified conclusion may correspond to a false version of a determined conclusion. The computing device may determine to include or omit each conclusion or modified conclusion based on the utility of including or omitting that conclusion or modified conclusion in the response. The utility of including or omitting a conclusion may be based on the goals of the computing device. The goals and utility of including a given conclusion or modified conclusion may comprise a corresponding justification for including or omitting that conclusion in an output response.

At step 350, the computing device may store the underlying data for generating the response. The underlying data may comprise the language input, conclusions, justifications for including or omitting each conclusion, and/or each conclusion selected for inclusion in a response. The underlying data may be stored in a tuple in some examples. In some examples, the underlying data corresponding to a given input and response may be stored in a database, such as database 140.

At step 360, the computing device may use NLG to generate a response to the language input. The computing device may generate the response based on applying NLG to the conclusions that were determined in step 340 to be included in the response. The computing device may then output the generated response, for instance to a client device, such as client device 110 or 120.

Returning back to the decision block 330, if the user did request sincerity mode ("YES" branch of decision block 330), and the user has sincerity mode permissions, the computing device may determine to include every conclusion (e.g., non-modified conclusion) in an output response. That is, for the language input received in step 310, the computing device may identify each conclusion that it has determined, and may select each of those determined conclusions for inclusion in an output response. In this manner, the computing device operating in sincerity mode will cause output of a response that does not omit any conclusions and does not include any modified conclusions.

At step 380, the computing device may generate and output a response using NLG. The outputted response includes all the previously-determined conclusions, and no modified conclusions. The outputted response also does not omit any determined conclusions.

As discussed herein, a computing device configured in accordance with the techniques of this disclosure may operate in a sincerity mode. As described with respect to FIG. 3, if a user provides an input to the computing device and the computing device is configured with sincerity mode enabled, the computing device may output a response that includes all conclusions determined for that response. Additionally, a computing device configured to operate in sincerity mode may also receive a request for the underlying data that caused the computing device to generate a previously-outputted response.

Figure 4:
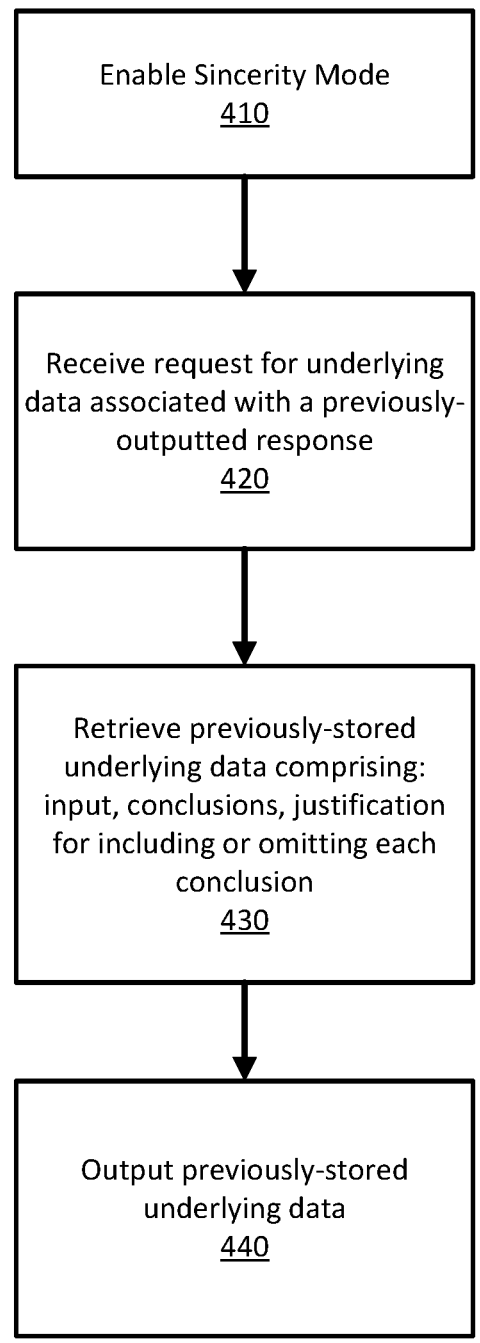
FIG. 4 shows another example of a flow chart of a process for outputting a response based on language input.

FIG. 4 shows an example flow chart of such a process 400 for outputting a response based on language input. Some or all of the steps of process 400 may be performed using one or more computing devices as described herein. In a variety of embodiments, some or all of the steps described below may be combined and/or divided into sub-steps as appropriate.

At step 410, the computing device (e.g., CA 132 executing on application server 130) may be configured to enable sincerity mode. The computing device may enable sincerity mode if, for example, a user having sincerity mode permissions requests that the computing device enable sincerity mode. Such a request may be received from a client device, such as one of client devices 110 or 120.

At step 420, the computing device may receive a request for the underlying data associated with a previously-outputted response. The request for the underlying data may specify the previously-outputted response or language that was previously input to the computing device and caused the computing device to generate a previous response output, etc.

At step 430, and based on the received request of step 420, the computing device may retrieve the stored underlying data associated with the previously-outputted response. The underlying data may comprise the language input, conclusions, goals, modified conclusions, response output, and/or justifications for including each conclusion (or modified version thereof) in the response output, and the response output itself.

At step 440, the computing device may output the underlying data that was retrieved in step 430. In some examples, the underlying data may be output as a tuple. In some examples, the underlying data may be output using NLG. The underlying data may be output in various other forms and manners as well.

Figure 5:
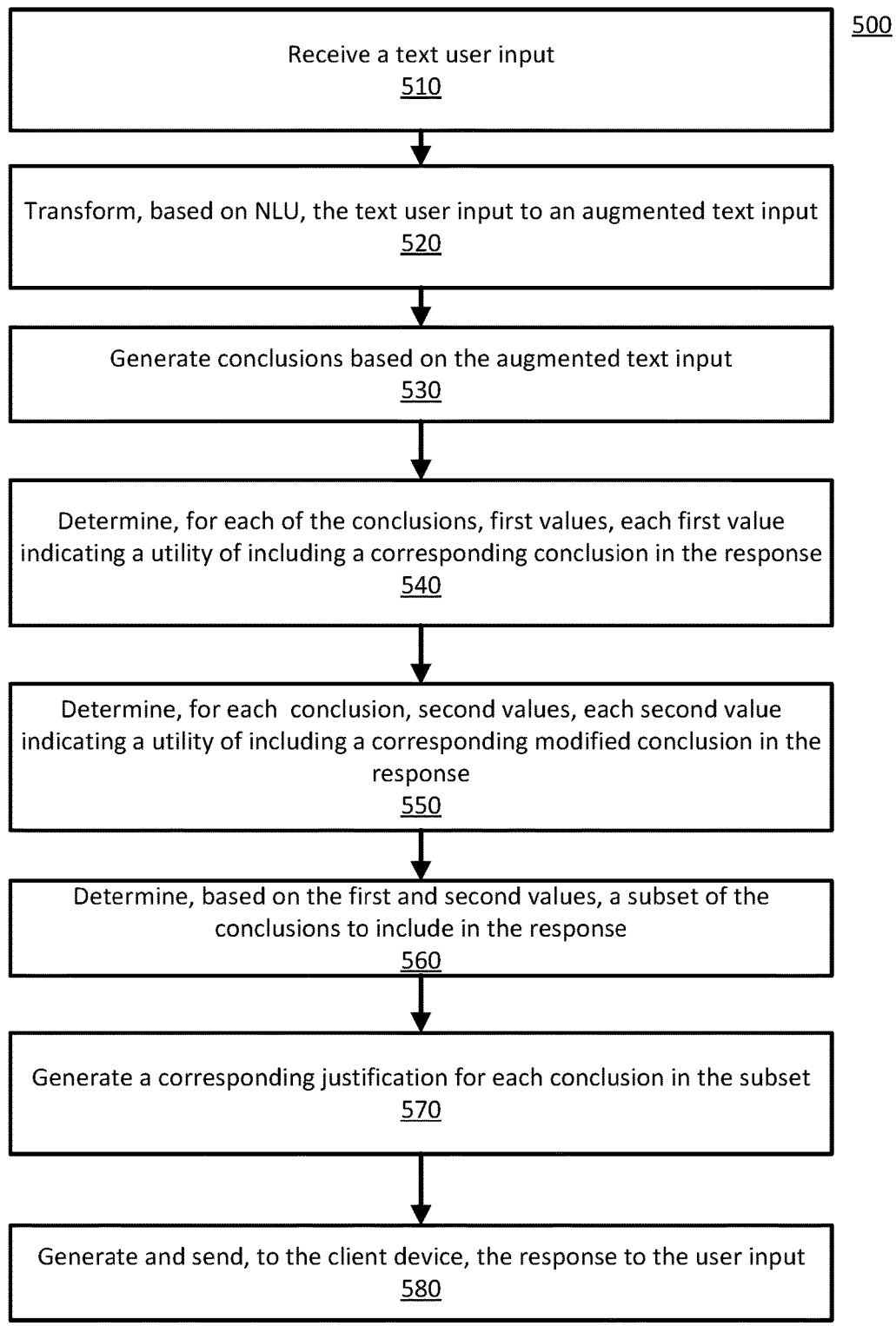
FIG. 5 shows another example of a flow chart of a process for outputting a response based on language input.

FIG. 5 shows an example flow chart of a process 500 for outputting a response based on language input. Some or all of the steps of process 500 may be performed using one or more computing devices as described herein. In a variety of embodiments, some or all of the steps described below may be combined and/or divided into sub-steps as appropriate.

Process 500 begins at step 510. At step 510, a computing device (e.g., CA 132 executing on application server 130) may receive a text user input. The text user input may be received, for example via a chatbot executing on application server 130, as one possible example. The text input may be received from a client device, such as one of client devices 110, 120, etc.

At step 520, the computing device may transform, based on NLU, the text input to an augmented text input. The augmented text input may comprise various annotations that are added via NLU. These annotations may enable a computing device to more readily understand the meaning of the text input received at step 510.

At step 530, the computing device may generate conclusions based on the augmented text input. The computing device may generate these conclusions based on one or more goals with which the computing device is configured. Some or all of these goals may be preconfigured or may be determined on-the-fly, for example using machine learning or rule-based techniques. Based on the configured goals, the computing device may determine one or more conclusions. These conclusions may be determined using any of various techniques such as inference, retrieval of data from a data source, evaluation, etc. As an example, if a user inputs a manuscript at the text user input in step 510, and the computing device has a goal of analyzing the grammar of the user input, the computing device may determine that the manuscript uses proper grammar or does not use proper grammar.

The value for a given conclusion may comprise a truth value, such as whether the computing device has determined the conclusion is true or not. For example, if a user inputs a manuscript at the text user input in step 510, and the computing device has a goal of analyzing the grammar of the user input, the computing device may attempt to determine whether the manuscript uses proper grammar. If the manuscript is determined to use proper grammar (e.g., based on performing grammar analysis of the manuscript), the computing device may generate a corresponding value, such as a "true" value, which indicates that the corresponding conclusion that the manuscript used proper grammar is true. In some examples, the corresponding truth value for a given conclusion may be "unknown," for example if the computing device is unable to reliably determine if a given conclusion is true or false.

At step 540, and for each determined conclusion, the computing device may determine a corresponding first value. Each first value may indicate a utility of including a corresponding conclusion in the response. These first values may be determined based on a function, such as a utility function. The utility function may take the current goals of the computing device and the conclusions as input, and based on the goals and the conclusions, may generate the corresponding first value. In some examples, the first value may comprise a probability value that the corresponding conclusion should be included in an output response. If the probability value is low, the utility of including the corresponding conclusion in the response may be low, and the computing device may determine to omit the conclusion from the response. If the probability value is sufficiently high (e.g., greater than a threshold probability), the computing device may determine to include the corresponding conclusion in the output response.

At step 550, the computing device may determine a corresponding second value for each conclusion. Each second value, of the second values, may indicate a utility of including a corresponding modified conclusion in the response. The modified conclusion may have the opposite truth value of the corresponding conclusion that was determined in step 540. For example, if the computing device determined in step 540 that the user's manuscript uses proper grammar, the modified version of that conclusion may be that the user's manuscript uses improper grammar. For each modified conclusion, the computing device may determine a utility for including that corresponding modified conclusion in an output response. In some examples, each second value may comprise a probability value. As with the first values determined in step 560, if a second value is sufficiently high (e.g., exceeds a threshold value), the computing device may determine to include the corresponding modified conclusion in the response output.

At step 560, and based on the first and second values, the computing device may determine a subset of the conclusions (either modified or un-modified) to include in the response. As an example, the computing device may determine which conclusions to include in the modified response based on whether their corresponding probability values exceed threshold values.

At step 570, the computing device may generate a corresponding justification for each conclusion included in the subset determined at step 560. The corresponding justification for each included conclusion may include the goals, and associated utility value that caused the computing device to include the conclusion in the response, as one possible example. The computing device may store the respective justification corresponding to each conclusion, regardless of whether the conclusion was included in the response or not. The computing device may retrieve the previously-stored justification if the computing device is operating in a sincerity mode, as an example.

At step 580, the computing device may generate a response to the user input, and send the response to the client device. The computing device may generate the response based on each conclusion included in the subset. In some examples, the computing device may use NLG to generate the response. The computing device may send the generated response to a client device, such as client device 110 or 120.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer-readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

What is claimed is:

1. A computer-implemented method comprising:
   receiving, from a client device, user input, wherein the user input comprises a text input;
   transforming, based on natural language understanding, the user input to an augmented text input, wherein the augmented text input comprises one or more annotations that are associated with the user input;
   generating, based on the augmented text input, conclusions that are associated with a response to the augmented text input, wherein each of the conclusions indicates a truth value corresponding to a fact;
   determining, for each of the conclusions, first values, wherein each of the first values indicates a utility of mentioning, in the response, a corresponding conclusion of the conclusions;
   determining, for each conclusion in the conclusions, second values, wherein each of the second values indicates a utility of modifying a corresponding conclusion of the conclusions, and includes the corresponding modified conclusion in the response;
   determining, based on the first values and the second values, a subset of the conclusions to include in the response;
   generating, for each conclusion in the subset, justifications, wherein each of the justifications:
      indicates a justification for including, in the response, a corresponding one of the conclusions; and
      is based on one of the first values or one of the second values; and
   sending, to the client device, the response to the user input, wherein the response comprises the subset.

2. The computer-implemented method of claim 1, further comprising:
   receiving, from the client device, a request for the justifications; and
   sending, to the client device and based on the request, the justifications.

3. The computer-implemented method of claim 2, further comprising:
   determining that a user associated with the client device is authorized to receive the justifications; and
   sending, to the client device and based on the user being authorized, the justifications.

4. The computer-implemented method of claim 2, further comprising:
   storing, as a tuple:
      the conclusions,
      the subset of the conclusions,
      the justifications, and
      the user input, and
   wherein sending the justifications comprises sending the tuple.

5. The computer-implemented method of claim 2,
   wherein the response comprises a response that was previously sent to the client device; and
   wherein the justifications sent to the client device comprise justifications that correspond to the response that was previously sent.

6. The computer-implemented method of claim 1, further comprising:
   receiving, from the client device, a request for the justifications;
   determining that a user associated with the client device is not authorized to receive the justifications; and
   refusing to send, to the client device and based on the user not being authorized, the justifications.

7. The computer-implemented method of claim 1, further comprising:
   determining that at least one of the conclusions has a corresponding fact that is unknown; and
   assigning, for each of the at least one of the conclusions, a value indicating that the corresponding fact is unknown.

8. The computer-implemented method of claim 1, further comprising:
   determining at least one goal associated with the response, wherein determining the subset of the conclusions to include in the response is based on the at least one goal.

9. The computer-implemented method of claim 1, wherein sending the response comprises:
   generating, using natural language generation, wording corresponding to the subset of the conclusions,
   wherein the response comprises the wording.

10. The computer-implemented method of claim 1, wherein the conclusions are generated based on one or more of:
    inference;
    retrieval of data from a data source; or
    evaluation.

11. The computer-implemented method of claim 1,
    wherein each of the corresponding modified conclusions comprises a conclusion that is false.

12. The computer-implemented method of claim 1, wherein the conclusions comprise a partial response to the user input.

13. A computing device comprising:
    one or more processors; and
    memory storing instructions that, when executed by the one or more processors, cause the computing device to:
       receive, from a client device, user input, wherein the user input comprises a text input;

transform, based on natural language understanding, the user input to an augmented user input, wherein the augmented user input comprises one or more annotations that are associated with the user input;

generate, based on the augmented user input, conclusions that are associated with a response to the augmented user input, wherein each of the conclusions indicates a truth value corresponding to a fact;

determine, for each of the conclusions, first values, wherein each of the first values indicates a utility of mentioning, in the response, a corresponding one of the conclusions;

determine, for each of the conclusions, second values, wherein each of the second values indicates a utility associated with modifying a corresponding conclusion of the conclusions and includes the corresponding modified conclusion in the response, and wherein the corresponding modified conclusion comprises a conclusion that is false;

determine, based on the first values and the second values, a subset of the conclusions to include in the response;

generate, for each conclusion in the subset, justifications, wherein each of the justifications:
  indicates a justification for including, in the response, a corresponding one of the conclusions; and
  is based on one of the first values or one of the second values; and send, to the client device, the response to the user input, wherein the response comprises wording that is based on the subset.

14. The computing device of claim 13, wherein the instructions, when executed by the one or more processors, cause the computing device to:
  determine the first values and the second values based on one or more utility functions.

15. The computing device of claim 13, wherein the instructions, when executed by the one or more processors, cause the computing device to:
  receive, from a second client device, a request for the justifications; and
  send, to the client device and based on the request, the justifications.

16. The computing device of claim 15, wherein the instructions, when executed by the one or more processors, cause the computing device to:
  determine that a user associated with the second client device is authorized to receive the justifications; and
  send, to the client device and based on the user being authorized, the justifications.

17. The computing device of claim 15, wherein the instructions, when executed by the one or more processors, cause the computing device to:
  determine at least one goal associated with the response; and
  determine the subset of the conclusions to include in the response based on the determined at least one goal.

18. The computing device of claim 13, wherein the instructions, when executed by the one or more processors, cause the computing device to:
  store, as a tuple:
    the conclusions,
    the subset of the conclusions,
    the justifications, and
    the user input,
  wherein sending the justifications comprises sending the tuple.

19. A non-transitory computer-readable storage medium comprising instructions that, when executed by one or more processors, cause a computing device to:
  receive, from a client device, user input, wherein the user input comprises a text input;
  transform, based on natural language understanding, the user input to an augmented user input, wherein the augmented user input comprises one or more annotations that are associated with the user input;
  generate, based on the augmented user input, conclusions that are associated with a response to the augmented user input, wherein each of the conclusions indicates a truth value corresponding to a fact;
  determine, for each of the conclusions, first values, wherein each of the first values indicates a utility of mentioning, in the response, a corresponding one of the conclusions;
  determine, for each conclusion in the conclusions, second values, wherein each of the second values indicates a utility of modifying a corresponding conclusion of the conclusions and includes the corresponding modified conclusion in the response, wherein the corresponding modified conclusion comprises a conclusion that is false;
  determine, based on the first values and the second values, a subset of the conclusions to include in the response;
  generate, for each conclusion in the subset, justifications, wherein each of the justifications:
    indicates a justification for including, in the response, a corresponding conclusion of the subset of the conclusions; and
    is based on one of the first values or one of the second values; and
  send, to the client device, the subset of the conclusions as the response to the user input;
  receive, from a second client device, a request for the justifications; and
  send, based on the request and to the second client device, the justifications.

20. The non-transitory computer-readable storage medium of claim 19, wherein the instructions, when executed by the one or more processors, cause the computing device to:
  determine the first values and the second values based on one or more utility functions.

* * * * *